United States Patent [19]

Mimura et al.

[11] Patent Number: 5,450,032

[45] Date of Patent: Sep. 12, 1995

[54] FSK DATA DEMODULATOR USING MIXING OF QUADRATURE BASEBAND SIGNALS

[75] Inventors: Masahiro Mimura; Makoto Hasegawa, both of Tokyo; Katsushi Yokozaki, Yokohama; Hiroyuki Harada, Kanazawa, all of Japan

[73] Assignee: Matsushita Electric Industrial Co., Ltd., Osaka, Japan

[21] Appl. No.: 209,140

[22] Filed: Mar. 11, 1994

[30] Foreign Application Priority Data

Mar. 12, 1993 [JP] Japan ................................. 5-051894

[51] Int. Cl.⁶ ............................................. H04L 27/14
[52] U.S. Cl. ................................... 329/300; 329/303; 375/324; 375/334
[58] Field of Search ............... 329/300, 301, 302, 303; 375/80, 88

[56] References Cited

U.S. PATENT DOCUMENTS 5,197,085 3/1993 Luff et al. .................. 329/303 X

FOREIGN PATENT DOCUMENTS 58-19038 2/1983 Japan .
463574 12/1992 Japan .
2101821 1/1983 United Kingdom .

Primary Examiner—Siegfried H. Grimm
Attorney, Agent, or Firm—Lowe, Price, LeBlanc & Becker

[57] ABSTRACT

A first demodulator for generating a demodulated signal by demodulating first and second baseband signals obtained from a received frequency shift keying signal, comprises: a first mixer for mixing the first baseband signal with the second baseband signal; a frequency divider for ½-frequency-dividing an output of the first mixer; a second mixer for mixing the first baseband signal with an output of said frequency divider; and a frequency judging circuit for judging whether or not a frequency of an output of the second mixer is larger than a reference value to generate the demodulated signal. In order to effect the frequency judging by the frequency judging circuit always at a high frequency, there may be further provided a first inverter after the first mixer, a second inverter after the frequency judging circuit for compensating the inverting of the first inverter, and a frequency comparing circuit for detecting the frequency of the output of the first mixer. In order to effect the frequency judging on the second baseband signal side, third and fourth mixers may be further provided. The frequency judging are made from the first baseband signal and the second baseband signal.

31 Claims, 10 Drawing Sheets

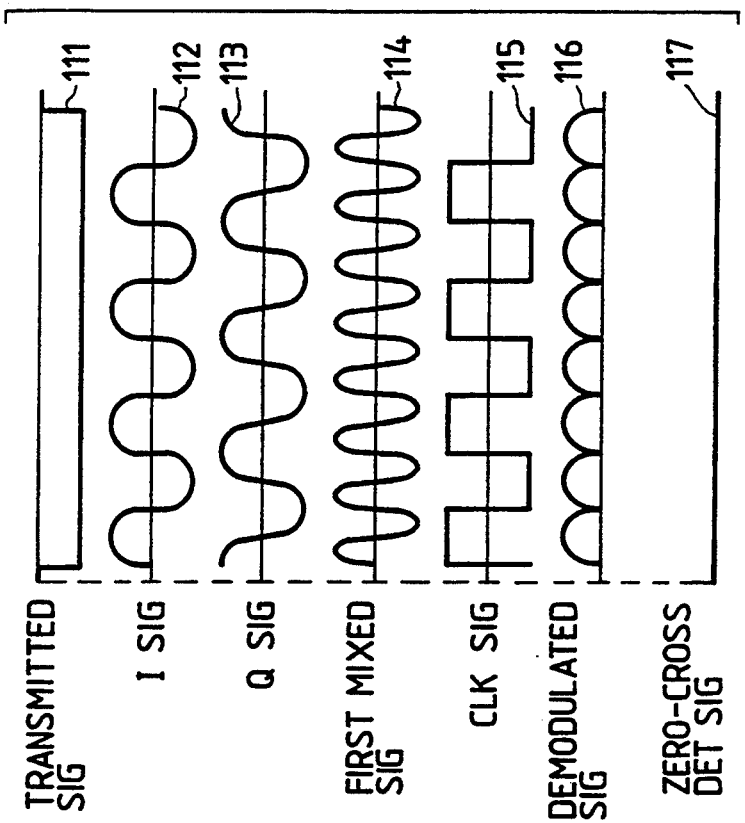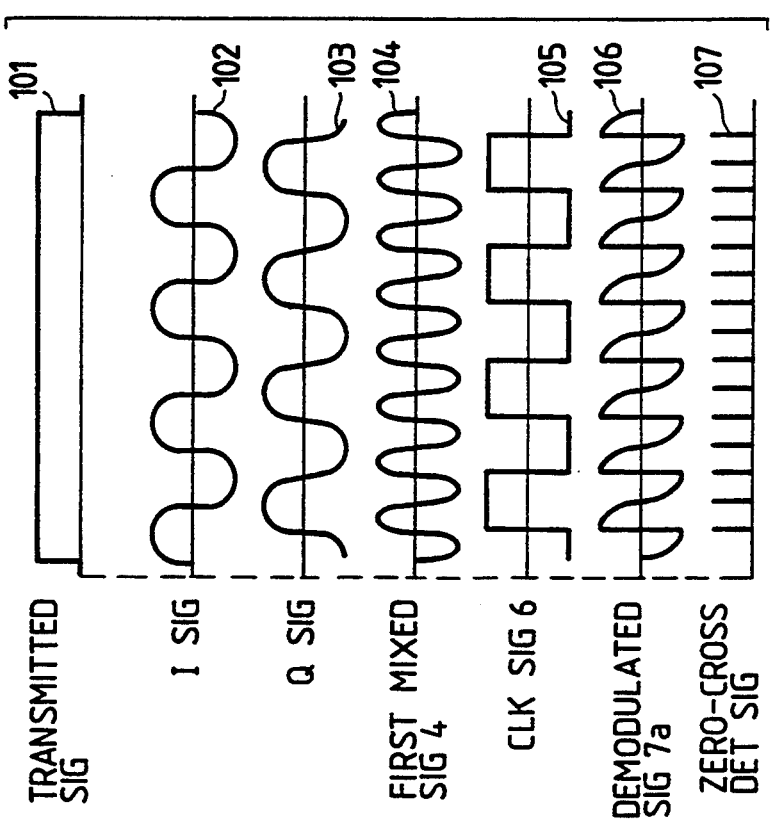

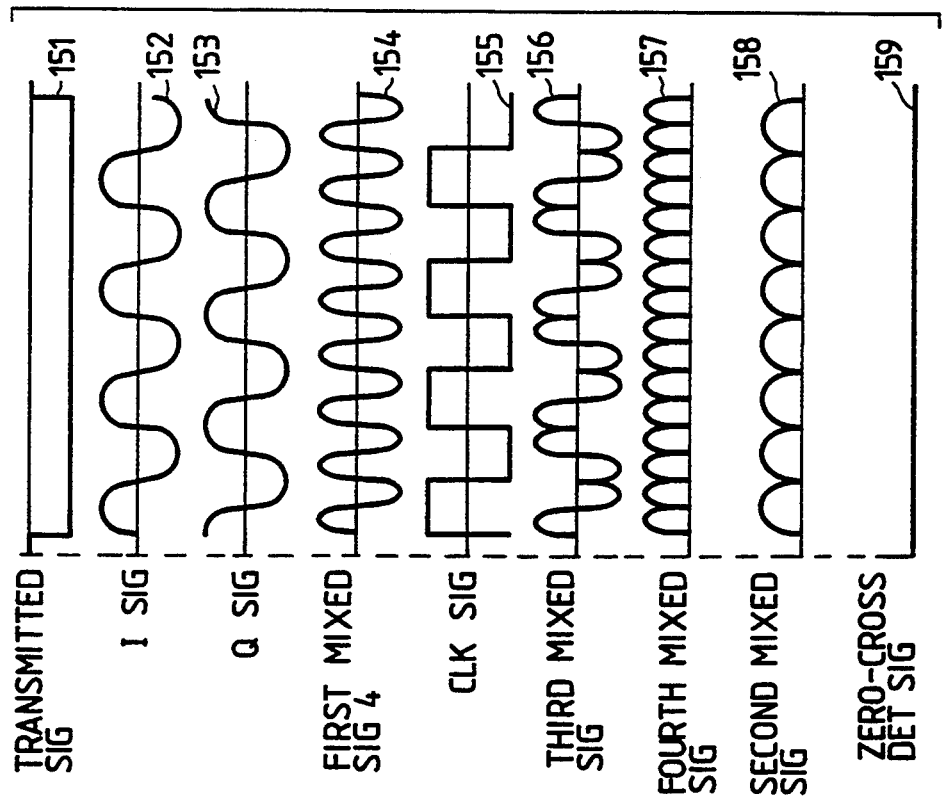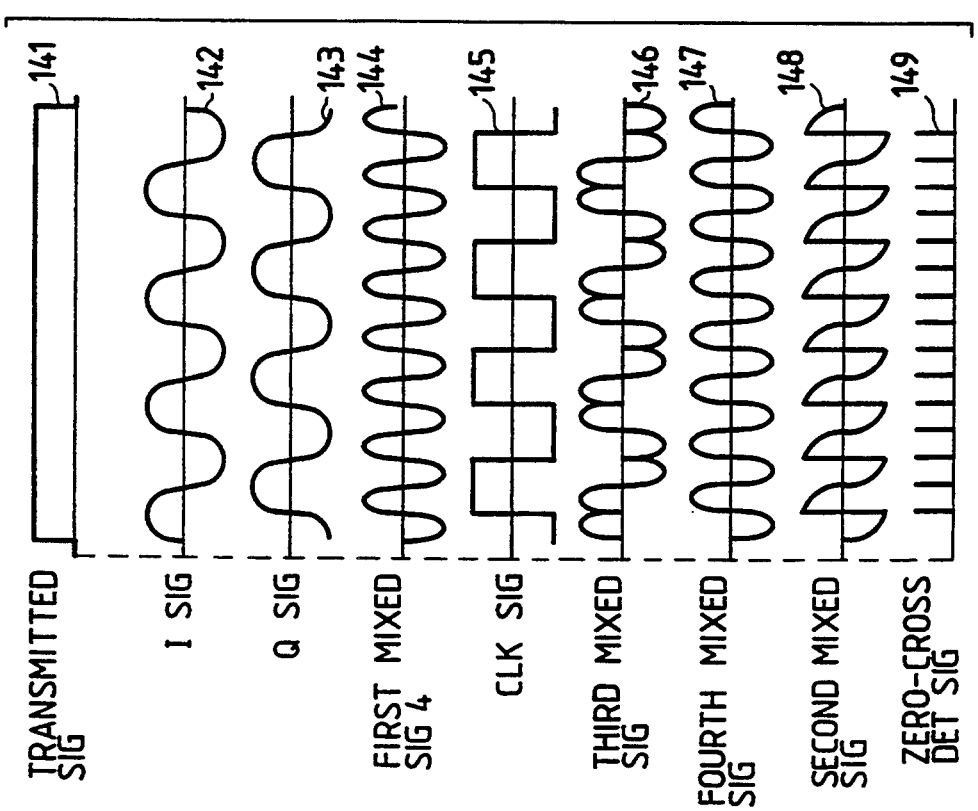

FSK DATA DEMODULATOR USING MIXING OF QUADRATURE BASEBAND SIGNALS

BACKGROUND OF THE INVENTION

1. Field of the Invention

This invention relates to an FSK data demodulator for demodulating FSK (frequency shift keying) data and particularly to an FSK data demodulator for demodulating FSK data with a converting circuit for converting a transmitted FSK signal into a baseband signal directly.

2. Description of the Prior Art

An FSK data demodulator is known. Such FSK data demodulator demodulates a received FSK data signal such that it obtains quadrature baseband signals and it decodes the quadrature baseband signal to a data signal. It obtains the baseband signal by direct conversion. That is, the baseband signals are directly converted from the received data signal.

Such a prior art FSK demodulator is disclosed in Japanese patent application provisional publication No. 58-19038. FIG. 20 is a block diagram of such a prior art FSK demodulator.

Hereinbelow will be simply described a prior art FSK data demodulator with reference to FIG. 20.

In FIG. 20, an FSK received signal is supplied to a mixer 81 and to a mixer 82 through a ninety-degree phase shifter 83 at the same time. The received signal and an output of the ninety-degree phase shifter 83 are down-converted by mixing them with an output signal of a local oscillator 84 respectively, and then, passed through low pass filters 85 and 86 for passing baseband signals to obtain I and Q signals respectively. The I signal is formed into a digital signal by an amplitude limiting amplifier 88. The Q signal is subjected to phase shifting by a ninety-degree phase shifter 87, and then, is formed into a digital signal by an amplitude limiting amplifier 89. Data is decoded by a logic operation circuit 90.

The reason why the direct conversion is adopted is that it is easy to implement its circuit in an IC because the circuit structure is simple. However, if communication speed is high such that a symbol rate of a transmitted data is equal to or higher than an FSK phase shift amount, there is a problem that the ninety-degree phase shifter should have an extremely broad band because it is necessary to shift a phase of the received data signal from a low frequency to a frequency of an order obtained by a sum of the modulation frequency shifting and the symbol rate to effect accurate decoding. Generally, a ninety-degree phase shifter capable of phase shifting a signal of a low frequency has a difficulty in implementation of its circuit into an integrated circuit (IC) because it needs a large capacitor in the circuit configuration. Thus, it prevents saving power consumption and miniaturization.

Moreover, in the actual receiver including the prior art FSK demodulator, there is a problem that if a high speed FSK signal mentioned above is received, demodulation is difficult because the signal to be phase-shifted contains a lot of discontinuous points, so that phase shifting becomes imperfect by the ninety-degree phase shifter and is difficult in demodulation.

SUMMARY OF THE INVENTION

The present invention has been developed in order to remove the above-described drawbacks inherent to the conventional FSK data modulator.

According to the present invention there is provided a first demodulator for generating a demodulated signal by demodulating first and second baseband signals obtained from a received frequency shift keying signal, the first and second baseband signals having a quadrature relation therebetween, a lead and lag relation between the first and second baseband signals being changed in accordance with frequency shift from a carrier frequency of the frequency shift keying signal, comprising: a first mixer for mixing the first baseband signal with the second baseband signal; a frequency divider for ½-frequency-dividing an output of the first mixer; a second mixer for mixing the first baseband signal with an output of the frequency divider; and a frequency judging circuit for judging whether or not a frequency of an output of the second mixer is larger than a reference value to generate the demodulated signal.

According to the present invention there is also provided a second demodulator, further comprising: a frequency comparing circuit responsive to an output of the frequency judging circuit for comparing the frequency of the first mixer with a predetermined frequency to detect that the frequency of first mixer is different from the predetermined frequency; a first inverter provided between the first mixer and the frequency divider for controlling of the inverting of the output of the first mixer in response to an output of the frequency comparing circuit; and a second inverter for controlling of the inverting of the output of frequency judging circuit in response to the output of the frequency comparing circuit.

According to the present invention there is further provided a third demodulator for generating a demodulated signal by demodulating first and second baseband signals obtained from a received frequency shift keying signal, the first and second baseband signals having a quadrature relation therebetween, a lead and lag relation between the first and second baseband signals being changed in accordance with frequency shift from a carrier frequency of the frequency shift keying signal, comprising: a first mixer for mixing the first baseband signal with the second baseband signal; a frequency divider for ½-frequency-dividing an output of the first mixer; a second mixer for mixing the first baseband signal with an output of the frequency divider; a third mixer for mixing an output of the frequency divider with an output of the first mixer; a fourth mixer for mixing an output of the third mixer with the second baseband signal; a first edge detection circuit for detecting an edge of an output of the second mixer; a second edge detection circuit for detecting an edge of an output of the fourth mixer; an adder for adding an output of the first edge detection circuit to an output of the second edge detection circuit; and a judging circuit responsive to the adding circuit for judging whether or not a frequency of an output of the adder is larger than a reference value to generate the demodulated signal.

BRIEF DESCRIPTION OF THE DRAWINGS

The object and features of the present invention will become more readily apparent from the following detailed description taken in conjunction with the accompanying drawings in which:

FIGS. 4A and 4B show waveforms of respective signals of the demodulating circuit shown in FIG. 1;

FIGS. 7A and 7B show waveforms of respective signals of the demodulator of the third embodiment;

The same or corresponding elements or parts are designated as like references throughout the drawings.

DETAILED DESCRIPTION OF THE INVENTION

Hereinbelow will be described a first embodiment of this invention.

Figure 1:
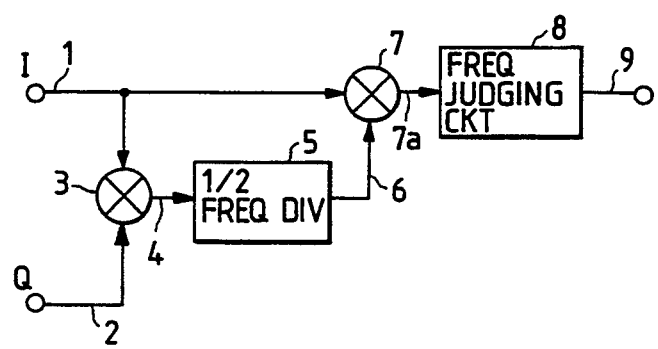
FIG. 1 is a block diagram of a demodulating circuit of the first embodiment.

FIG. 1 is a block diagram of a demodulating circuit of the first embodiment. In FIG. 1, numerals 1 and 2 are first and second baseband signals which are generally referred to as I and Q signals having a quadrature relation therebetween wherein a phase relation therebetween is inverted in accordance with a frequency shift of an FSK signal. Numeral 3 is a first mixer for mixing said I and Q signals to supply a first mixed signal 4. Numeral 5 is a ½ frequency divider for frequency dividing the mixed signal 4 to generate a clock signal 6. Numeral 7 is a second mixer for mixing the I signal 1 and the clock signal 7 to generate a second mixed signal 7a. Numeral 8 is a frequency judging circuit for judging a frequency of the output of the second mixer 7 through counting pulses in the output of the second mixer 7 to generate a frequency judged signal 9.

Figure 5:
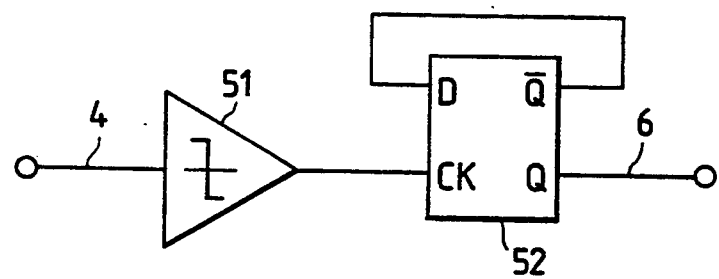
FIG. 5 is a block diagram of the first embodiment of the ½ frequency divider shown in FIG. 1.

FIG. 5 is a block diagram of the first embodiment of The ½ frequency divider 5. The first mixed signal 4 is wave-shaped by an amplitude-limiting amplifier 51 and frequency-divided by a D latch circuit 52 having a clock input connected to an output of the amplitude-limiting amplifier 51, Q and $\overline{Q}$ outputs, and a D input connected to the $\overline{Q}$ output. Therefore, in response to every rising edge of the first mixed signal 4, an output level at Q output changes, so that ½ frequency dividing is provided.

Figure 8:
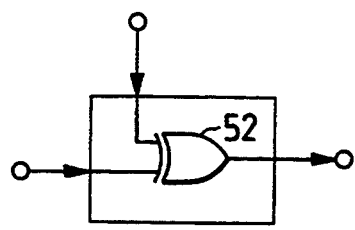
FIG. 8 is a block diagram of an example of mixing circuits used in the embodiments throughout the specification.

FIG. 8 is a block diagram of an example of mixing circuits used in the embodiments throughout the specification. Each of the first and second mixing means of this embodiment comprises an exclusive OR circuit 52 for example.

Figure 9:
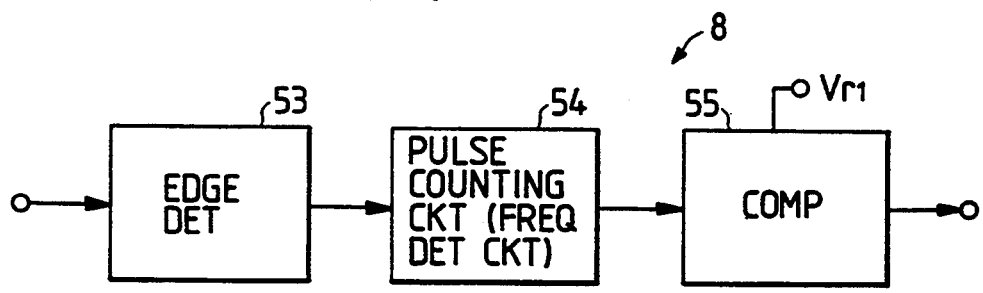
FIG. 9 is a block diagram of an example of the frequency judging circuit used in the embodiments throughout the specification.

FIG. 9 is a block diagram of an example of the frequency judging circuit used in the embodiments throughout the specification.

The frequency judging circuit 8 comprises, for example, an edge detecting circuit 53 for detecting the second mixed signal 7a, a pulse counting circuit 54 for counting pulses of an output of the edge detecting circuit. The pulse counting circuit may comprises a lowpass filter as a frequency detecting circuit. An output of the counting circuit is compared with a reference level. However, any frequency judging circuit capable of judging of frequency in the frequency range of the second mixed signal 7a can be used. That is, if the pulse counting circuit has a digital counting circuit counting the pulses of an output of the edge detection circuit 53 for a predetermined interval, the comparing circuit 55 can be omitted because a high bit of the output the digital counting circuit provides the output of the frequency judging circuit 8, i.e., the demodulated signal. Further, in the case that the counting circuit comprises a lowpass filter, the comparing circuit 55 can be omitted by suitably selecting its time constant.

Operation of the first embodiment will be described. FIGS. 4A and 4B show waveforms of respective signals of the demodulating circuit shown in FIG. 1.

The I and Q signals show sinusoidal waveforms shown by waveforms 102 and 103 having a phase difference of 90 degrees therebetween as shown. In FIG. 4A, a transmitted data signal indicative of an original data is "1", or the mark, the I signal leads tile Q signal by a phase angle of 90 degrees. The first mixed signal 4 as a reference signal shows another sinusoidal wave having a frequency twice the I and Q signals as shown by waveform 104. The first mixed signal 4 is divided by the ½ frequency dividing circuit 5. The first mixed signal 4 is waveshaped by the amplitude limiting amplifier 51. The waveshaped signal is supplied to the clock input of the D latch 52. The D latch 52 frequency-divides the first mixed signal 4 to generate the clock signal 6 of an NRZ signal as shown by waveform 105. That is, an output level of the D latch 52 is inverted during every period of the first mixed signal 4.

The D latch 52 supplies the clock signal 6 to the second mixer 7. Here, as shown by waveforms 102, 103, and 105, there is a phase difference between the I signal and the clock signal 6. On the other hand, the Q signal is in phase with the clock signal 6. Therefore, the second mixed signal generated by mixing the I signal and the clock signal 6, is obtained as a demodulated signal as shown by waveform 106 having a frequency twice the frequency of the I and Q signals. The frequency Judging circuit 8 detects both edges of the demodulated signal 7a. In other words, the frequency judging circuit 8 detects zero-crossing in the demodulated signal to supply a zero-cross detection signal as shown by waveform 107. The frequency judging circuit 8 effects pulse counting with the lowpass filter shown in FIG. 16 mentioned later. The output of the lowpass filter represents the data signal shown by waveform 101.

On the other hand, in FIG. 4B, the transmitted data signal indicating that the original data is "0", or a space, the I signal lags the Q signal by a phase angel of 90 degrees. The first mixed signal 4 as a reference signal shows a sinusoidal wave having a frequency twice the I and Q signals as shown by waveform 114. The first mixed signal 4 is divided by the ½ frequency dividing circuit 5. That is, the ½ frequency divider 5 supplies the clock signal 6 to the second mixer 7 as shown by waveforms 115, the I signal is in phase with the clock signal 6, so that the second mixed signal 7a generated by mixing the I signal and the clock signal 6, i.e., the demodulated signal is obtained as shown by waveform 116. Because this demodulated signal having the waveform 116 has no zero-crossing points, the frequency judging circuit 8 outputs the demodulated signal having a low level as shown by the waveform 117. Thus, the original data indicative of "0" is reproduced. As mentioned above, the FSK signal can be demodulated by the demodulating circuit of this embodiment.

Figure 13:
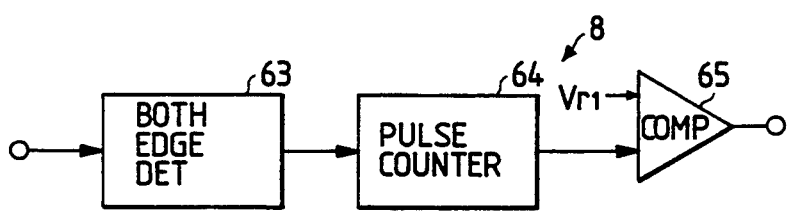
FIG. 13 is a block diagram of the first embodiment for showing the frequency Judging circuit which is also used in tile second embodiment.

FIG. 13 is a block diagram of this embodiment for showing tile frequency judging circuit 8 which is also used in the second embodiment. The frequency judging circuit 8 comprises a both edge detector 63 for detecting both edges in the input signal thereinto, i.e., the demodulated signal 7a to output a pulse signal and a pulse counter 64 for converting the pulse signal to a voltage signal. That is, the pulse counter 64 acts as a F/V converter for converting the frequency of the pulse signal to the voltage signal. A voltage comparator 65 may be further provided. The pulse counter 64 may comprises a digital counting circuit for counting the pulses for a predetermined interval determined by a timer circuit (not shown).

Figure 2:
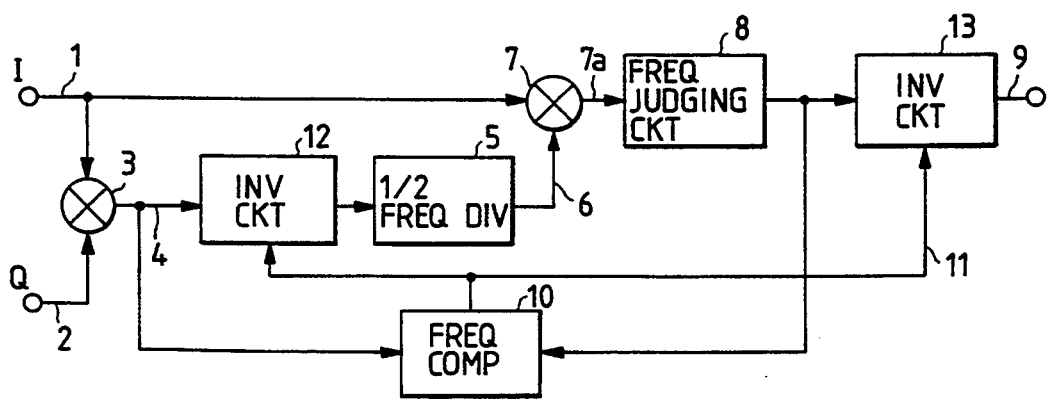
FIG. 2 is a block diagram of a second embodiment of a demodulating circuit of this invention.

FIG. 2 is a block diagram of a second embodiment of a demodulating circuit of this invention.

The basic structure and the operation of the second embodiment are the same as the first embodiment. Difference of the second embodiment from the first embodiment is in that signal inverting circuits 12 and 13, and a frequency comparing circuit 10 are added. That is, the first mixed signal 4 is supplied to the ½ frequency divider 5 through the signal inverting circuit 12 and the demodulated signal is outputted after processing in the signal inverting circuit 13.

Figure 6A:
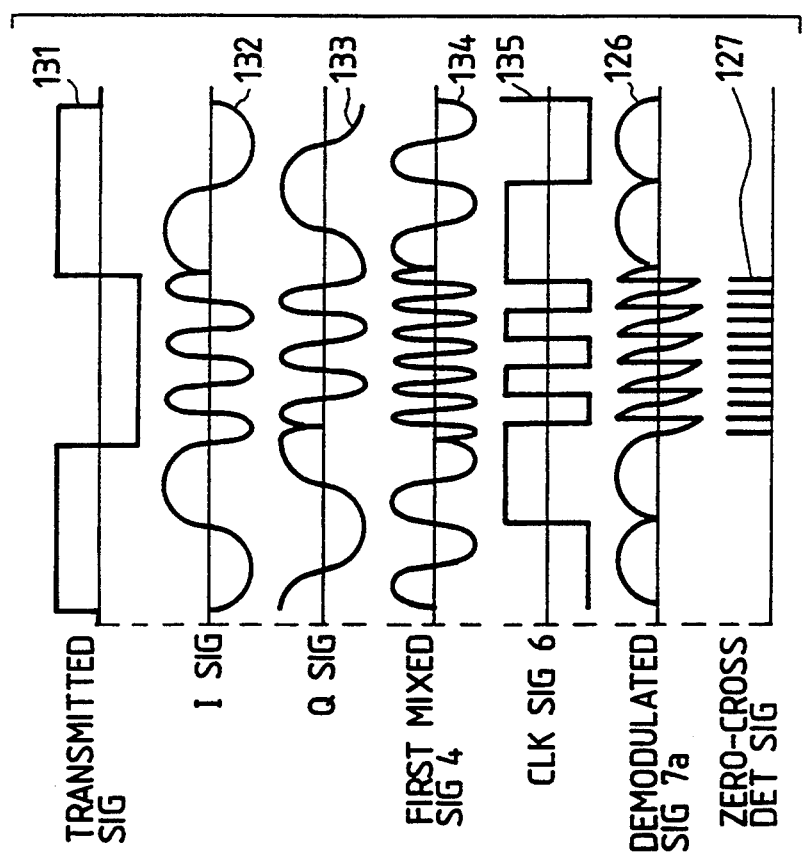
FIG. 6A shows waveforms of respective signals in the demodulating circuit of the second embodiment for showing a demodulating processing in the condition that a frequency deviation ΔF occurs between a local frequency of the receiver and an FSK carrier frequency of a transmitter in the condition that the inverting circuits are not provided.
Figure 6B:
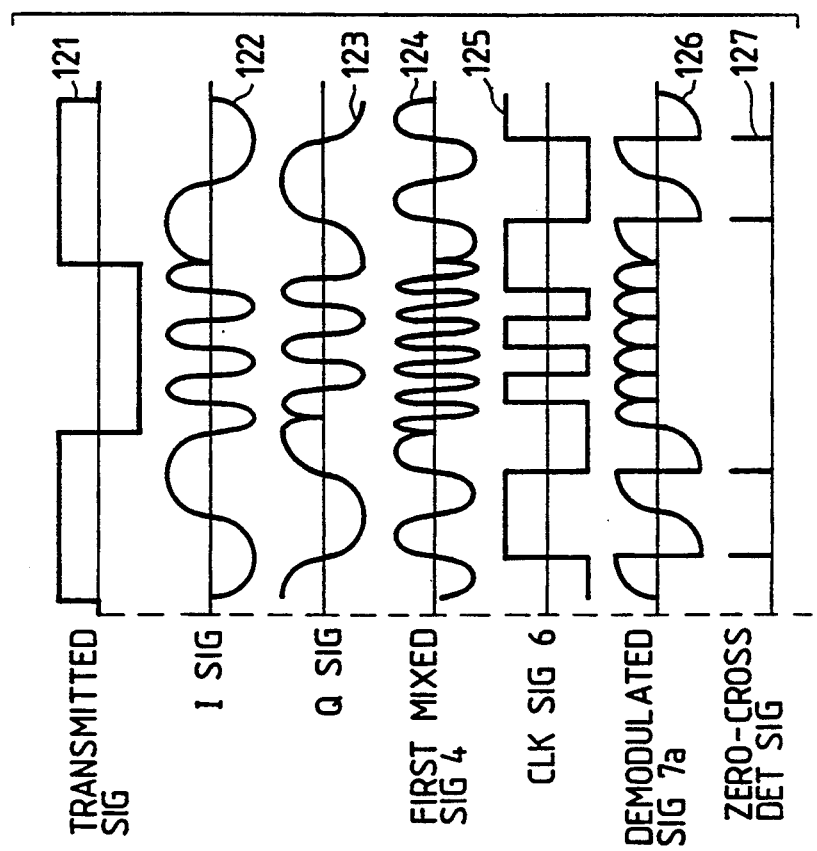
FIG. 6B shows waveforms of respective signals in the demodulating circuit of the second embodiment for showing a demodulating processing in the same condition as FIG. 6A but the inverting circuits are provided.

Operation will be described. As mentioned above, the basic operation is the same as the first embodiment. Thus, only different points of operation of the second embodiment will be described. FIG. 6A shows waveforms of respective signals in the demodulating circuit of the second embodiment for showing a demodulating processing in the condition that a frequency deviation ΔF occurs between a local frequency of the receiver (not shown) for supplying the I and Q signals and an FSK carrier frequency of a transmitter (not shown) in the condition that the inverting circuits 12 and 13 are not provided. FIG. 6B shows waveforms of respective signals in the demodulating circuit of the second embodiment for showing a demodulating processing in the same condition but the inverting circuits 12 and 13 are provided. As shown in FIGS. 6A and 6B, the frequency of the baseband signal varies with change in sign of the transmitted data between (the FSK frequency shift+ΔF) and (tile FSK frequency shift−ΔF). As described in the first embodiment, the demodulation processing according to this invention is effected by counting zero-crossing of the demodulated signal having a frequency twice the frequency of the baseband signal by the frequency judging circuit 8. However, when the frequency of the baseband signal is (the FSK frequency shift−ΔF), the demodulation is effected at a lower frequency than the predetermined frequency. Therefore, as shown in the zero-crossing detection signal in FIG. 6A, there is a tendency that delay occurs in the demodulation processing. This causes decrease in demodulation sensibility.

Therefore, in this embodiment, a signal inverting circuit 12 is provided to invert either of baseband signals (I or Q) in order to count the zero-crossing at a high frequency when there is a frequency deviation. That is, while the zero-crossings are counted, the frequency of the baseband signal is detected and compared. If the detected frequency is lower than the FSK frequency shift, either of the I or Q signal is inverted. Thus, a phase relation between the I and Q signals is inverted, so that counting of zero-crossing occurs while the frequency of the baseband signal is higher than the FSK frequency shift. In this case, as the demodulated data is also inverted, the demodulated data must be further inverted. Here, the inverting either of the baseband signal I or Q is equivalent to that the reference signal 4 obtained by mixing the I and Q signals is inverted. Therefore, the reference signal 4 is inverted in this embodiment.

More specifically, as shown in FIG. 2, the frequency comparing circuit 10 detects whether or not the frequency of the reference signal 4 is lower than a frequency twice the FSK frequency shift when the frequency judging circuit 8 detects zero-crossing in the demodulated signal 7a. When the frequency comparing circuit 10 detects this condition, it supplies an inverting control signal 11 to the first and second inverting circuits 12 and 13. In response to this, the inverting circuits 12 and 13 output signals having inverted sign with respect to input signals thereinto. FIG. 6B shows demodulating processing when the reference signal 4 is inverted by the polarity inverting circuit 13. As shown in FIGS. 6A and 6B, zero-crossing does not occur as shown in FIG. 6A at a processing interval, whereas at the corresponding processing interval the zero-crossing occurs as shown in FIG. 6B. As described, because the reference signal is inverted and thus the demodulated result is inverted, the output of the frequency judging circuit is also inverted to obtain the final result.

As described above, according to this embodiment, when a deviation between the local oscillation frequency of the receiver and the FSK carrier frequency occurs, the delay in the demodulating processing causing the decrease in sensitivity can be prevented because it is possible that demodulation is always carried out at a higher frequency than the FSK frequency though tile frequency of the baseband signals decreases around signal level change point of the transmitted signal.

Figure 10:
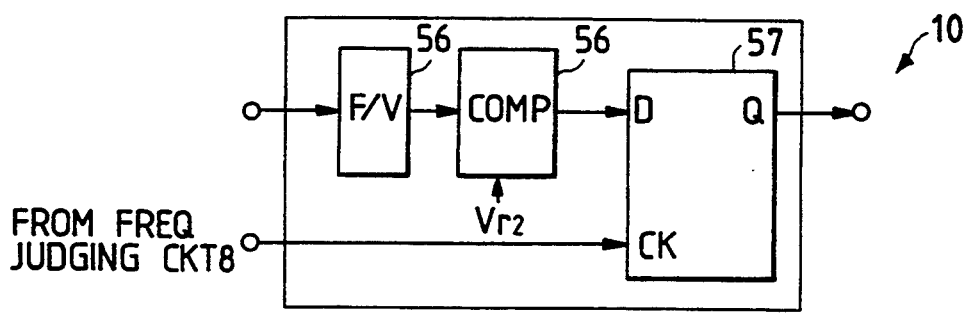
FIG. 10 is a block diagram of the second embodiment showing the frequency comparing circuit 10.

FIG. 10 is a block diagram of this embodiment showing the frequency comparing circuit 10. The frequency comparing circuit 10 comprises a frequency to voltage converter (F/V converter) for converting the frequency of the reference signal 4 to a voltage output, a comparator for comparing an output of tile F/V converter with a reference voltage Vr2, and a D latch circuit 57 having a D input responsive to an output of the comparator, a clock input responsive to the output of the frequency judging circuit 8, and Q output for supplying the inverting control signal 11.

The F/V converter 56 converts the frequency of the reference signal 4 to the voltage output. The D latch circuit 57 outputs a level of the voltage output as the inverting control signal 11 in response to the output of the frequency Judging circuit 8 via the clock input from the Q output.

Figure 11:
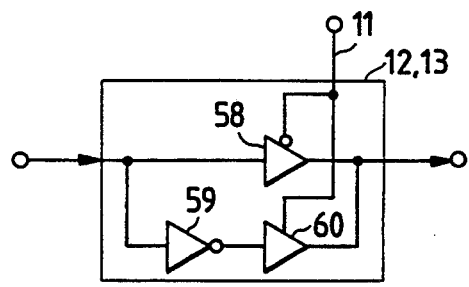
FIG. 11 is a block diagram of the second embodiment showing a first example of the inverting circuits.

FIG. 11 is a block diagram of this embodiment showing a first example of the inverting circuits 12 and 13. The inverting circuit 12 or 13 comprises a tri-state buffer 58 for supplying a non-inverted signal from an input signal thereto when the inverting control signal 11 is "0", an inverter 59 for supplying an inverted signal from the input signal thereto, and a tri-state buffer 60 for supplying a non-inverted signal from an output signal of the inverter 59 when the inverting control signal 11 is "1", An output terminal of the inverting circuit 12 or 13 is connected to tri-state outputs of the buffers 58 and 60.

The tri-state buffer 58 supplies the non-inverted signal from the input signal thereto when the inverting control signal 11 is "0". On the other hand, the inverter 59 supplies the inverted signal from the input signal thereto, and the tri-state buffer 60 supplies a non-inverted signal from the output signal of the inverter 59 when the inverting control signal 11 is "1", Because the output terminal of the inverting circuit 12 or 13 is connected to tri-state outputs of the buffer 58 and 60 which are controlled by the inverting control signal 11, so that the controlled inversion is obtained.

Figure 12:
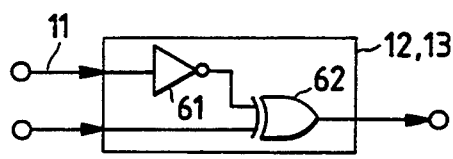
FIG. 12 is a block diagram of second embodiment showing a second example of the inverting circuits.

FIG. 12 is a block diagram of this embodiment showing a second example of the inverting circuits 12 and 13. The second example of the inverting circuit 12 or 13 comprises an inverter 61 for inverting the inverting control signal 11 and an EX-OR circuit 62 for effecting the EX-OR operation between an output of the inverter 61 and an input signal of this circuit, i.e., the first mixed signal 4 or the output of the frequency judging circuit 16.

The inverter 61 inverts the inverting control signal 11. The EX-0R circuit 62 effects the EX-OR operation between an output of the inverter 61 and the input signal of this circuit, i.e., the first mixed signal 4 or the output of the frequency judging circuit 8. Therefore, at the output of the EX-OR, there is provided the inversion controlled signal 11.

Figure 3:
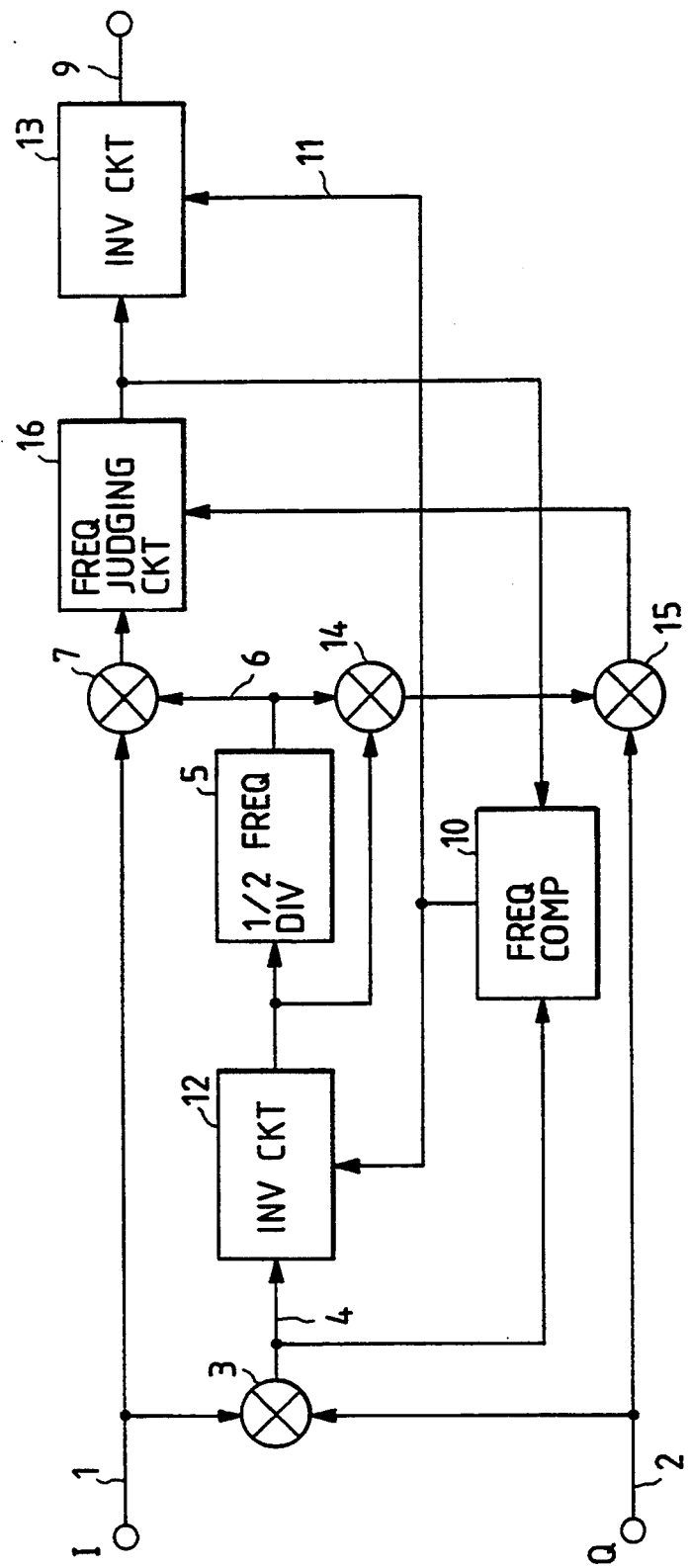
FIG. 3 is a block diagram of a third embodiment showing a demodulator.

FIG. 3 is a block diagram of a third embodiment showing a demodulator. FIGS. 7A and 7B show waveforms of respective signals of the demodulator of the third embodiment. The basic structure of the third embodiment is the same as the second embodiment. Difference is in that a third mixer 14 for mixing an output of the inverting circuit 12 with an output of the frequency divider 5, a fourth mixer 15 for mixing the Q baseband signal 2 with an output of the third mixer 14, and a frequency judging circuit 16 which replaces the frequency judging circuit 8 are provided.

FIG. 7A shows a demodulating process of this embodiment in the condition that the I signal 1 leads the Q signal 2 by 90 degrees. The third mixer 14 mixes the output of the inverting circuit, i.e., the first mixed signal 4 with the output of the frequency divider 5 to produce a third mixed signal as shown by waveform 146. The third mixed signal has a phase difference of a half of the period of the clock signal 6 (waveform 145) and the Q signal (waveform 143). Then, the third mixed signal is mixed with the Q signal by the fourth mixer 15 to provide the fourth mixed signal shown by waveform 147. The fourth mixed signal also provides the demodulated signal by detecting zero-crossing points and counting pulses of the output of the detection of the zero-crossing points similar to the second mixed signal. Therefore, the frequency judging circuit has two inputs and judges frequencies of both inputs thereof to supply the demodulated signal.

FIG. 7B shows a demodulating process of this embodiment in the condition that the I signal 1 lags the Q signal 2 by 90 degrees. As mentioned above, the third and fourth mixed signals are obtained. The third mixed signal is in phase with the Q signal with respect to the zero-cross points. Therefore, there are no zero-crossing points similar to the second mixed signal. Thus, the frequency judging circuit 16 outputs a logic low level.

Figure 14:
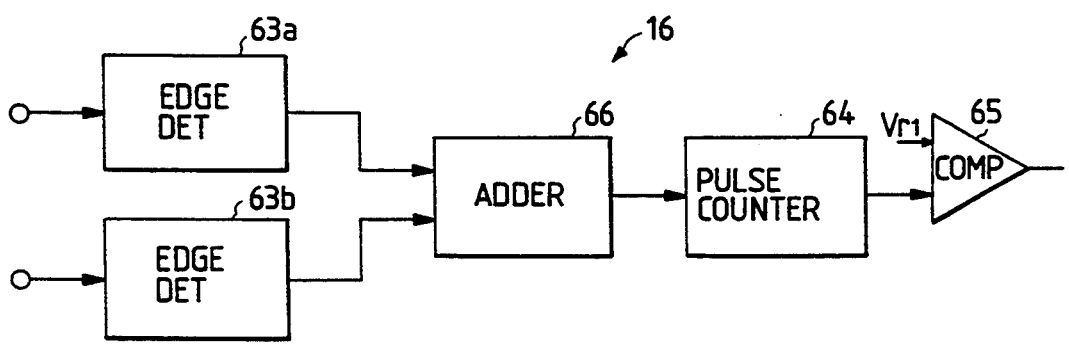
FIG. 14 is a block diagram of the third embodiment for showing a first example of the frequency judging circuit.

FIG. 14 is a block diagram of the third embodiment for showing a first example of the frequency judging circuit 16. The first example of the frequency judging circuit 16 comprises an edge detector 63a for detecting an edge in the demodulated signal from the mixer 7 (shown in FIG. 3) to output a first pulse signal, an edge detector 63b for detecting an edge in the output signal of the mixer 15 to output a second pulse signal, an adder 66 for adding the first pulse signal to the second pulse signal, a pulse counter 64 for converting the pulses to a voltage signal through counting the pulses.

Figure 15:
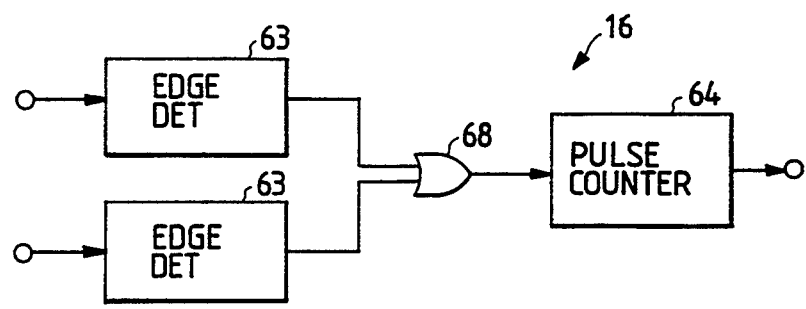
FIG. 15 is a block diagram of the third embodiment for showing a second example of the frequency judging circuit.

FIG. 15 is a block diagram of the third embodiment for showing a second example of the frequency judging circuit 16. The second example of the frequency judging circuit is basically the same as the first example of the frequency judging circuit. Difference is in that the addition of the first and second pulse signals is effected by an OR circuit 68.

Figure 16:
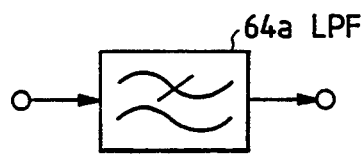
FIG. 16 is a block diagram of a first example of a pulse counter used in the first to third embodiments.

FIG. 16 is a block diagram of a first example of a pulse counter used in the first to third embodiments. The pulse counter comprises a lowpass filter 64a. The lowpass filter 64a converts the pulse signal inputted thereto into the voltage signal.

Figure 17:
FIG. 17 is a block diagram of a second example of a pulse counter used in the first to third embodiments.

FIG. 17 is a block diagram of a second example of a pulse counter used in the first to third embodiments. The pulse counter comprises a one shot trigger circuit 64b. The one shot trigger circuit 64b converts the pulse signal inputted thereto into the voltage signal.

Figure 18:
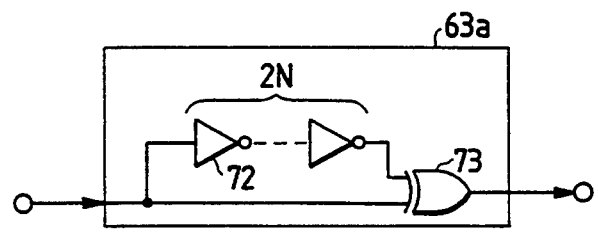
FIG. 18 is a block diagram of a first example of the edge detector used in the first to third embodiments.

FIG. 18 is a block diagram of a first example of the edge detector used in the first to third embodiments. The first example of the edge detector 63a comprises an even number of inverters 72 connected in series for delaying the input signal thereto and an EX-OR circuit 73 having a first input connected to an output of the inverters 72 connected in series and a second input receiving the input signal for supplying the pulse signal.

Figure 19:
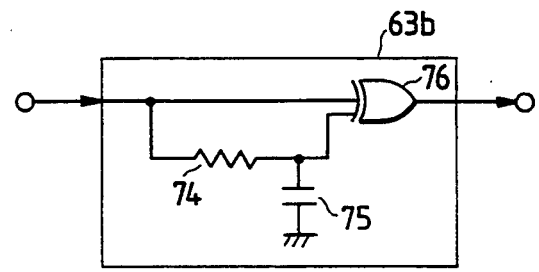
FIG. 19 is a block diagram of a second example of the edge detector used in the first to third embodiments.
Figure 20:
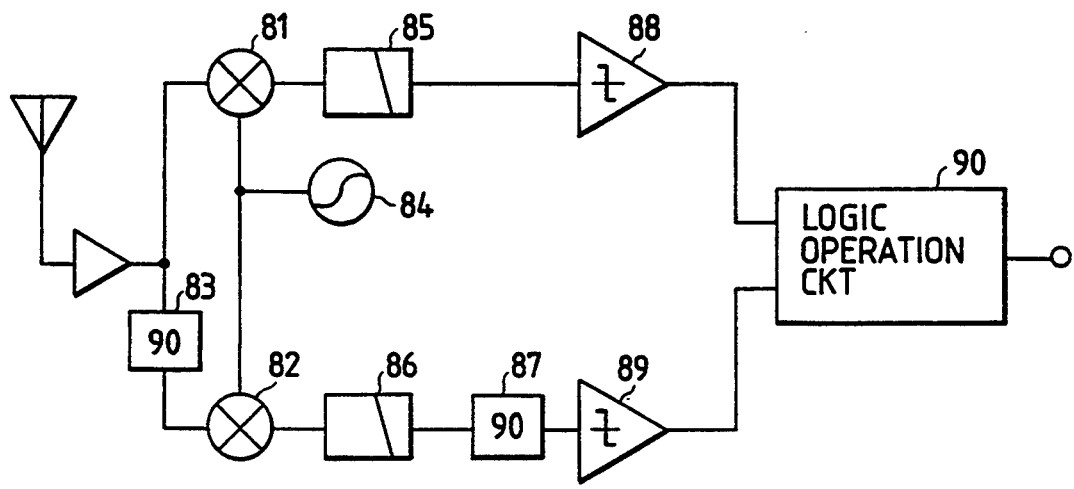
FIG. 20 is a block diagram of a prior art FSK demodulator.

FIG. 19 is a block diagram of a second example of the edge detector used in the first to third embodiments. The second example of tile edge detector 63b comprises an integrating circuit having a resistor 74 and a capacitor 75, and an EX-OR 76. One input of the EX-OR receives the input signal thereinto and the other input receives the input signal through the integrating circuit. Therefore, an edge of the input signal is detected.

As mentioned, the demodulation of the FSK signal is provided by the output of the frequency judging circuit 16.

As described above, the demodulation operation is effected at the I signal side and the Q signal side and the final result is provided by both results of I and Q signals so that a reliability of the demodulation operation is improved.

In the third embodiment, the frequency comparing circuit 10, the first and second inverting circuit 12 and 13 can be omitted if the deviation of the local oscillation frequency is negligible.

Moreover, in the above mentioned embodiments, the frequency modulation is frequency shift keying. However, the demodulation of this invention is applicable to other frequency modulation systems where frequency shift modulation is equivalently effected.

Further, in the above mentioned embodiments, the receiving method is assumed to be a direct conversion receiving method. However, the demodulation of this invention is applicable to a heterodyne demodulation system by assuming the carrier signal as the intermediate frequency signal.

As mentioned above, the demodulation circuits according to this invention provide for the demodulation of the FSK signal with simple circuit structures and are adaptive to the frequency deviation of the local oscillator.

According to this invention, the demodulator can be structured by digital circuit elements, so that the demodulation circuit is adaptable to a low power consumption structure and can be formed into an integrated circuit.

What is claimed is:

1. A demodulator for generating a demodulated signal by demodulating first and second baseband signals obtained from a received frequency shift keying signal, said first and second baseband signals having a quadrature relation therebetween, a lead and lag relation between said first and second baseband signals being changed in accordance with frequency shift of a carrier frequency of said frequency shift keying signal, comprising:
   (a) first mixing means for mixing said first baseband signal with said second baseband signal;
   (b) frequency dividing means for ½-frequency-dividing an output of said first mixing means;
   (c) second mixing means for mixing said first baseband signal with an output of said frequency dividing means; and
   (d) frequency judging means for judging whether or not a frequency of an output of said second mixing means is larger than a reference value to generate said demodulated signal.

2. A demodulator as claimed in claim 1, wherein each of said first and second mixing means comprises an exclusive OR circuit.

3. A demodulator as claimed in claim 1, wherein said frequency dividing means comprises a D type flip flop circuit having a data input, a clock input responsive to an output of said first mixer, an inverted output connected to said data input, and a non-inverted output for supplying said output signal of said frequency dividing means.

4. A demodulator as claimed in claim 1, wherein said frequency judging means comprises:
   (a) an edge detection circuit for detecting a zero-crossing of said output of said second mixing means to produce a pulse signal;
   (b) a frequency detection circuit for counting pulses of said pulse signal for a predetermined interval; and
   (c) a comparator for comparing an output of said frequency detection circuit with a predetermined level to generate said demodulated signal.

5. A demodulator as claimed in clam 4, wherein said frequency detection circuit comprises a lowpass filter.

6. A demodulator as claimed in claim 4, wherein said frequency detection circuit comprises a one-shot trigger circuit.

7. A demodulator as claimed in claim 4, wherein said edge detection circuit comprises an even number of inverting circuits connected in series for delaying an input signal thereto and an exclusive-OR circuit having a first input responsive to an output of said invention circuits connected in series and a second input responsive to said input signal.

8. A demodulator as claimed in claim 4, wherein said edge detection circuit comprises an integrating circuit for integrating an input signal thereto and an exclusive-OR circuit having a first input responsive to an output of said integrating circuit and a second input responsive to said input signal.

9. A demodulator as claimed in claim 1, further comprising:
   (a) frequency comparing means responsive to an output of said frequency judging means for comparing said frequency of said first mixing means with a predetermined frequency to detect that said frequency of said first mixing means is different from said predetermined frequency;
   (b) first inverting means provided between said first mixing means and said frequency dividing means for controlling of the inverting of said output of said first mixing means in response to an output of said frequency comparing means; and
   (c) second inverting means for controlling of the inverting of said output of frequency judging means in response to said output of said frequency comparing means.

10. A demodulator as claimed in claim 9, wherein said frequency comparing means comprises an F/V converter for converting a frequency of an output of said first mixer to a voltage signal, a comparing circuit for comparing said voltage signal with a reference voltage, and a D type flip flop circuit having a data input responsive to an output of said comparing circuit, a clock input responsive to an output of said frequency judging circuit, and a non-inverted output for supplying an output of said frequency comparing means.

11. A demodulator as claimed in claim 9, wherein said first inverting circuit comprises an inverter for inverting said output of said first mixing means, a first tri-state buffer circuit for supplying a first output from said output of said first mixing means when said output of said frequency judging means is in a first condition, a second tri-state buffer circuit for supplying an inverted signal of said output of said first mixing means when said output of said frequency Judging means is in a second condition.

12. A demodulator as claimed in claim 9, wherein said second inverting circuit comprises an inverter for inverting said output of said frequency judging circuit, a first tri-state buffer circuit for supplying a first output from said output of said frequency judging means when said output of said frequency judging means is in a first condition, a second tri-state buffer circuit for supplying an inverted signal of said output of said frequency judging means when said output of said frequency judging means is in a second condition.

13. A demodulator as claimed in claim 9, wherein said first inverting circuit comprises an inverter for inverting an output of said first mixing means and an exclusive-OR circuit having a first input responsive to said inverter and a second input responsive to said output of said frequency judging means, said exclusive-OR circuit outputting either of an inverted output of said first mixing means or a non-inverted output in accordance with said output of said frequency judging means.

14. A demodulator as claimed in claim 9, wherein said second inverting circuit comprises an inverter for inverting an output of said frequency judging means and an exclusive-OR circuit having a first input responsive to said inverter and a second input responsive to said output of said frequency comparing means, said exclusive-OR circuit outputting either of an inverted output of said first mixing means or a non-inverted output in accordance with said output of said frequency comparing means.

15. A demodulator for generating a demodulated signal by demodulating first and second baseband signals obtained from a received frequency shift keying signal, said first and second baseband signals having a quadrature relation therebetween, a lead and lag relation between said first and second baseband signals being changed in accordance with frequency shift of a carrier frequency of said frequency shift keying signal, comprising:
  (a) first mixing means for mixing said first baseband signal with said second baseband signal;
  (b) frequency dividing means for frequency-dividing an output of said first mixing means;
  (c) second mixing means for mixing said first baseband signal with an output of said frequency dividing means;
  (d) third mixing means for mixing an output of said frequency-dividing means with an output of said first mixing means;
  (e) a fourth mixing means for mixing an output of the third mixing means with said second baseband signal;
  (f) a first edge detection circuit for detecting an edge of an output of said second mixing means;
  (g) a second edge detection circuit for detecting an edge of an output of said fourth mixing means;
  (h) adding means for adding an output of said first edge detection circuit to an output of said second edge detection circuit; and
  (i) a frequency detecting circuit responsive to said adding means for judging whether or not a frequency of an output of said adding means is larger than a reference value to generate said demodulated signal.

16. A demodulator as claimed in claim 15, wherein each of said first and second mixing means comprises an exclusive OR circuit.

17. A demodulator as claimed in claim 1, wherein said frequency judging means comprises:

(a) an edge detection circuit for detecting both edges of said output of said second mixing means to produce a pulse signal; and
  (b) a frequency detection circuit for counting pulses of said pulse signal for a predetermined interval to generate said demodulated signal.

18. A demodulator as claimed in claim 17, wherein said frequency detection circuit comprises a one-shot trigger circuit.

19. A demodulator as claimed in claim 17, wherein said edge detection circuit comprises an even number of inverting circuits connected in series for delaying an input signal thereto and an exclusive-OR circuit having a first input responsive to an output of said inverting circuits connected in series and a second input responsive to said input.

20. A demodulator as claimed in claim 17, wherein said edge detection circuit comprises an integrating circuit for integrating an input signal thereto and an exclusive-OR circuit having a first input responsive to an output of said integrating circuit and a second input responsive to said input.

21. A demodulator as claimed in claim 15, wherein said first edge detection circuit detects said edge of said output of said second mixing means by detecting a zero-crossing of said output of said second mixing means to produce a first pulse signal, said second edge detection circuit detects said edge of said output of said fourth mixing means by detecting a zero-crossing of said output of said fourth mixing means to produce a second pulse signal, said adding means adds said first pulse signal to said second pulse signal to produce a third pulse signal, and said frequency detection circuit counts pulses of said third pulse signal for a predetermined interval to generate said demodulated signal.

22. A demodulator as claimed in claim 21, wherein said frequency detection circuit comprises a lowpass filter.

23. A demodulator as claimed in claim 21, wherein said frequency detection circuit comprises a one-shot trigger circuit.

24. A demodulator as claimed in claim 21, wherein said edge detection circuit comprises an even number of inverting circuits connected in series for delaying an input signal thereto and an exclusive-OR circuit having a first input responsive to an output of said inverting circuits connected in series and a second input responsive to said input.

25. A demodulator as claimed in claim 21, wherein said edge detection circuit comprises an integrating circuit for integrating an input signal thereto and an exclusive-OR circuit having a first input responsive to an output of said integrating circuit and a second input responsive to said input.

26. A demodulator as claimed in claim 16, wherein said first edge detection circuit detects said edge of said output of said second mixing means by detecting a zero-crossing of said output of said second mixing means to produce a first pulse signal, said second edge detection circuit detects said edge of edge of said output of said fourth mixing means by detecting a zero-crossing of said output of said fourth mixing means to produce a second pulse signal, said adding means comprises a logic OR circuit which effects a logic OR operation between said first pulse signal and said second pulse signal, and said frequency detection circuit counts pulses produced by said logic OR circuit for a predetermined interval to generate said demodulated signal.

27. A demodulator as claimed in claim 26, wherein said frequency detection circuit comprises a lowpass filter.

28. A demodulator as claimed in claim 26, wherein said frequency detection circuit comprises a one-shot trigger circuit.

29. A demodulator as claimed in claim 26, wherein each of said edge detection circuit comprises an even number of inverting circuits connected in series for delaying an input signal thereto and an exclusive-OR circuit having a first input responsive to an output of said inverting circuits connected in series and a second input responsive to said input.

30. A demodulator as claimed in claim 26, wherein each of said edge detection circuit comprises an integrating circuit for integrating an input signal thereto and an exclusive-OR circuit having a first input responsive to an output of said integrating circuit and a second input responsive to said input.

31. A demodulator as claimed in claim 9, wherein said frequency judging means comprises:
(a) an edge detection circuit for detecting both edges of said output of said second mixing means to produce a pulse signal; and
(b) a frequency detection circuit for counting pulses of said pulse signal for a predetermined interval to generate said demodulated signal.

* * * * *